Patented Oct. 12, 1926.

1,602,624

UNITED STATES PATENT OFFICE.

CLAYTON OLIN NORTH, OF TALLMADGE TOWNSHIP, SUMMIT COUNTY, OHIO, ASSIGNOR TO THE RUBBER SERVICE LABORATORIES CO., OF AKRON, OHIO, A CORPORATION OF OHIO.

PROCESS OF MANUFACTURING RUBBER GOODS.

No Drawing.   Application filed March 19, 1923.   Serial No. 626,242.

My invention is directed to the art known as the compounding of rubber articles and is particularly directed to an improvement in the method of compounding, that is, preparing for manufacture, articles made of semi-hard sponge rubber. My invention is not, however, limited solely to this class of rubber goods, but may be advantageously followed in the manufacture of any class of rubber articles wherein it is desired to incorporate, for any reason, decomposable, or gas evolving substances, whose decomposition is desired during, but not prior to, the vulcanization of the articles.

It has long been known that certain materials could not be used to advantage in the preparation of rubber compounds particularly if any water, or other material were present which was partially or in the case of certain materials of lower boiling point was completely vaporizable at a temperature reached by the rubber compound while being mixed on the differential rubber mixing mills. This has proved to be a decided disadvantage, particularly in the preparation of a compound to be used for the manufacture of hard or semi-hard or soft sponge rubber, wherein water, or water liberating compounds are used admixed with ammonium carbonate or some other compound liberating volumes of gases at the temperature of vulcanization. In these cases, a very considerable portion of the gas liberating constituent was decomposed while the rubber was being plasticized on the mixing rolls and the other compounding ingredients added thereto. In order to be sure that at least a minimum amount of the gas-liberating constituents should escape this decomposition, during the mixing operation, it has usually been customary to use a large excess of the material. This not only caused a waste of materials, but, what was far more serious, since the proportions of the materials were chosen more according to observation than by rule, successive batches of the finished product have differed in quality and texture or even have been completely ruined for any useful purpose.

Sponge rubber has long been manufactured by incorporating into the rubber compound on the differential mixing rolls the necessary amount of a material which would liberate volumes of gas when heated during the vulcanization process. As materials for this purpose, there have been used very commonly, water, or ammonium salts such as ammonium carbonate, or combinations of water and ammonium carbonate, or, in fact, any substance, which, upon being heated to the vulcanization temperature, would evolve volumes of gases. Since the escape of the gases was prevented, the gases in expanding throughout the rubber compound would produce the wellknown cellular structure of sponge rubber.

Although water, or a mixture of water and ammonium carbonate, has been commonly used for the manufacture of sponge rubber, their use has not been generally satisfactory, due, as was previously pointed out, to an indeterminable loss of the gas-evolving constituents, caused by the heating up of the mass during the mixing operation. The varying and indeterminable gas-loss taking place during the mixing of the rubber compound, has made it practically impossible to obtain a finished sponge rubber product having the desired texture and cellular structure I have found that it is possible to obtain a sponge rubber of uniform cellular structure and possessing cells closely approximating a predetermined number per unit of volume, by carrying out the preparation of the compound in such a manner as to entirely preclude or avoid any decomposition of the gas-evolving constituents during the milling of the compound or prior to the vulcanizing thereof.

The method whereby this result is attained consists in preparing a suspension of the gas evolving constituent, or decomposable material in a carrier liquid, and then incorporating the suspension into the rubber mix during the mixing of the compound on the rubber mills, but after the complete plasticization of the rubber. In this manner, a complete and homogeneous dispersion of the gas-liberating constituent throughout the entire mass is realized. As a carrier liquid, I prefer a substance such as mineral oil, although any other liquid having a boiling point higher than that of water and in which the gas-evolving constituent may or may not be soluble, and which is also preferably immiscible with water, may be used. My best results are realized when the suspension used approaches a permanent emulsion in form and stability. In the preparation of a semi-hard or hard sponge rubber by means of my invention, I preferably prepare a suspension of 15 parts ammonium carbonate to 8 parts mineral oil and incorporate the required amount of this suspension into the compound being mixed on the mills, after the rubber has been completely plasticized and during, or preferably, after the addition of the other compounding ingredients thereto. Since no odor of ammonia is noticeable in the vicinity of the mixing mill, it is definitely shown that no decomposition of the ammonium carbonate has taken place. The compound is then vulcanazed by heat in molds in the usual manner. Other materials than ammonium carbonate may be treated in the same manner.

For example, certain accelerators of vulcanization, such as aldehyde ammonia, paraphenylene diamine, hexamethylene tetramine and the like may be suspended in a small quantity of a high boiling liquid, and this suspension then used in the proper amount in the rubber mix. This process is of special value to follow to avoid the use of any water in the mix as might be the case if a soft sponge rubber is being prepared by the usual method. Broadly then, my invention may be used for the preparation of any rubber compound wherein it is desired to incorporate compounds readily decomposable by heat in the presence of moisture.

Although I have shown by an example that my invention is of great value in preparing a semi-hard sponge rubber, it is to be understood that I do not limit myself solely to this one class of rubber goods. My invention is likewise applicable to the preparation of a soft or hard sponge rubber as well as for the manufacture of any rubber product in which it is desired to incorporate any material whose decomposition below the vulcanizing temperature is to be avoided.

What I claim is:—

1. In the manufacture of rubber goods, the mixing method comprising the addition of a suspension of a heat decomposable material in a liquid boiling above 100 C'' to the plasticized rubber on the mixing mills.

2. In the manufacture of rubber goods, the mixing method comprising the addition of a heat decomposable material suspended in an hydro-carbon oil to the plasticized rubber on the mixing mills.

3. In the manufacture of rubber goods, the mixing method comprising the addition of a petroleum suspension of an ammonium carbonate to the plasticized rubber on the mixing mills.

4. In the manufacture of rubber goods of predetermined porosity per unit of volume, the mixing method which comprises the addition to the plasticized rubber, of a heat decomposable material suspended in a carrier liquid.

5. The process of manufacturing sponge rubber which comprises plasticizing the rubber, adding thereto a heat decomposable material suspended in a carrier liquid and vulcanizing the mass.

6. The process of manufacturing sponge rubber which comprises adding a suspension of a heat decomposable material to a mixture of plasticized rubber and sulfur and vulcanizing the same.

7. The process of incorporating a heat decomposable material into a rubber mix which comprises preparing a suspension of said heat decomposable material in a non-solvent for the same, and adding said suspension to the plasticized rubber mix on the mixing mills.

8. The process of manufacturing sponge rubber which comprises plasticizing rubber, incorporating compounding and vulcanizing ingredients therewith, adding a suspension of ammonium carbonate in petroleum thereto, and vulcanizing the mass.

9. The process of incorporating ammonium carbonate into a rubber mix, which comprises preparing a suspension of ammonium carbonate in petroleum oil, and adding said suspension to the plasticized rubber mix on the mixing rolls.

CLAYTON OLIN NORTH.